United States Patent [19]
Sayegh

[11] Patent Number: 6,084,541
[45] Date of Patent: Jul. 4, 2000

[54] SELF DIAGNOSIS AND SELF HEALING SCHEME FOR DIGITAL BEAM-FORMING

[75] Inventor: Soheil I. Sayegh, Gaithersburg, Md.

[73] Assignee: Comsat Corporation, Bethesda, Md.

[21] Appl. No.: 09/114,495

[22] Filed: Jul. 13, 1998

[51] Int. Cl.[7] ................................................. H04B 7/185
[52] U.S. Cl. .............................. 342/354; 455/8; 455/428
[58] Field of Search .................................. 342/352, 354, 342/373; 455/8, 428, 450, 452

[56] References Cited

U.S. PATENT DOCUMENTS

| | | | |
|---|---|---|---|
| 4,451,916 | 5/1984 | Casper et al. | 370/16 |
| 5,034,752 | 7/1991 | Pourailly et al. | 342/373 |
| 5,594,941 | 1/1997 | Dent | 455/13.4 |
| 5,666,646 | 9/1997 | McCollum et al. | 455/8 |
| 5,856,804 | 1/1999 | Turcotte et al. | 342/371 |

Primary Examiner—Thomas H. Tarcza
Assistant Examiner—Dao L. Phan
Attorney, Agent, or Firm—Siugrue, Mion, Zinn, Macpeak & Seas, PLLC

[57] ABSTRACT

A completely autonomous failure recovery scheme for digital beam forming that provides self-diagnosis and self-healing of faulty processing chains in a communications satellite payload. A baseline processor comprises a plurality of processing chains that are identical in hardware and differ only in software. A redundant chain is programmed identically to the first processing chain by downloading the appropriate software coefficients from a controller. The first chain is then selected by a SELECT logic component its output is compared by a COMPARE logic component to the output of the redundant chain. In the absence of malfunctions, the two outputs should be identical. If the two outputs are not identical, the chain is diagnosed as faulty and it is replaced by a "hot" standby redundant chain. Further, a control signal from the diagnosis module alters the position of at least one output switch to disconnect the faulty module. The redundant chain is then programmed identically to the second processing chain and the outputs are compared to determine whether the chain is faulty. The cycle repeats for each consecutive processing chain. This permits the identification of which chain, if any, is faulty. This scheme is completely autonomous providing both self-diagnosis and self-healing.

11 Claims, 4 Drawing Sheets

SELF DIAGNOSIS AND SELF HEALING SCHEME FOR DIGITAL BEAM-FORMING

BACKGROUND OF THE INVENTION

The present invention relates in general to a communications satellite payload with digital channelization and digital beam-forming. More particularly, the invention relates to a completely autonomous failure recovery scheme, providing self diagnosis and self healing, for faulty signal processing chains in a satellite payload. Such scheme significantly enhances the reliability of the satellite payload.

FIG. 1 illustrates a communications satellite payload with digital channelization and digital beam-forming. Frequency multiplexed traffic from a few large gateway stations is received by global antenna 1. This traffic is then routed through the upper branch of the figure, demultiplexed into discrete bands, processed, by a respective chain of conventional filter and multiplex components, and transmitted from an array antenna 2A. In order to route each channel of traffic to its appropriate destination beam, the total traffic uplinked to the global antenna 1 must be channelized into narrow frequency bands containing one or a few channels each. These bands are routed to predetermined destination beams via corresponding processing chains.

Similarly, in the return direction, the traffic received by the array antenna 2A is passed through several elements in a respective chain of conventional demultiplex and filter components on board the satellite and routed, through the lower branch of the figure, to the global antenna for transmission to the destination gateway stations. The processing that is required for the gateway receiving direction is quite similar to the processing that is conducted in the gateway transmitting direction.

The process for channelization of a gateway transmitted signal on-board the satellite consists of three operations in three separate elements. Frequency demultiplexing is conducted in demultiplexer 4, switching is conducted in switch 5, and frequency remultiplexing is conducted in remultiplexer 8. The demultiplexer 4 segments an up-link frequency band into a number of sub-bands. The switching unit 5 directs the signals in each sub-band to a corresponding processing chain having a respective input port. Finally, the frequency remultiplexer 8 in each processing chain assembles the various signals that are switched to each port into a composite signal for modulation onto a carrier and transmission from a respective array 2A.

The demultiplexed signals that are directed to a predetermined processing chain 2B are fed through a beam-forming network 6, which forms beams in the desired directions by assigning an appropriate delay in each antenna element path 2B. In conventional RF beam-forming, the required delays are implemented using microwave phase shifters, whereas in digital implementations, the effect of the delays (phase shifts) is introduced by adding a proper phase value to the baseband signal. The effect of these delays (phase shifts) is to cause the signals that are assigned to a given beam to add up coherently (phase build-up) in that beam direction. The large number of beams and antenna feed elements that are planned for future satellites makes the mass requirements of analog channelizers and beam-formers prohibitively large. The flexibility in channelization and beam-forming for those future satellites is best met with advanced digital technology.

Digital Beam Forming (DBF) is performed on a sample waveform by introducing an appropriate phase shift to each complex sample of the waveform at every antenna processing chain 2B. The phase shift that is introduced will depend on the position of the element in the array and on the desired direction of the beam. The cumulative effect of the phase shifts is to cause input samples to each processing chain to add up coherently ("phase build-up") in the desired beam direction. It is sometimes desirable to introduce some amplitude weight shifting, in addition to the phase shift, to shape the beams. In this case, the DBF operation amounts to multiplying each input sample by an appropriate complex number. Multiple beams are formed by simple superposition, since the beam-forming and channelization operations are linear.

FIG. 2 illustrates the baseline processor of FIG. 1, with four processing chains in the upper branch of the satellite communications payload. The output of an analog-to-digital converter 3 is coupled to a demultiplexer 4 whose output provides a common input for all of the processing chains 20. Although only four parallel processing chains 20 are illustrated, the total number of processing chains 20 may be much larger. Each processing chain 20 consists of digital beam forming 6, a buffer 7 and a remultiplexer 8. The output of each chain is then input to a digital to analog converter 9.

The conventional method for diagnosing failures in the processing chains 20 of a satellite payload is based on introducing an external stimulus, such as a pilot signal, and measuring the processor's response to that stimulus. The disadvantage of this method is the need for additional hardware to stimulate the processor and measure its response. In many cases, this also results in a disruption of real time operation.

Therefore, there is a need for a self diagnosis scheme, which is able to detect failures in satellite payload processing chains by capitalizing on the availability plural processing chains that are identical in hardware, and differ only in software. Further, there is a need for a self healing scheme that is able to automatically replace a processing chain, which has been diagnosed as being faulty, with a "hot" standby chain. In this environment, it is desirable to provide both self diagnosis and self healing of processing chains 20 with little added hardware and without a disruption of normal operation.

SUMMARY OF THE INVENTION

In view of the forgoing, it is an object of the present invention to provide a completely autonomous failure recovery scheme which overcomes the disadvantages associated with the known method and which fulfills all of the advantages sought therefor.

It is another object of the present invention to provide an improved method and apparatus for generating a satellite payload with digital channelization and digital beam-forming.

Another object of the present invention is to provide a method and apparatus for implementing a self diagnosis scheme for detecting faulty processing chains of a satellite payload, with little added hardware and without disrupting real time operation.

It is yet a further object of the present invention to provide a method and apparatus for implementing a self diagnosis scheme that programs a redundant chain identically to a processing chain of a satellite payload and compares the outputs of the two chains to determine whether the processing chain is faulty.

It is yet a further object of the present invention to provide a self healing scheme for automatically replacing a faulty processing chain of a satellite payload with a "hot" standby processing chain.

It is yet a further object of the present invention to provide a control signal that alters the position of at least one output switch when a processing chain is diagnosed as faulty, so that the faulty chain is disconnected by the switch.

Accordingly, these and other objects of the present invention is achieved by:

BRIEF DESCRIPTION OF THE DRAWINGS

The above objectives and advantages of the present invention will become more apparent from the detailed description taken in conjunction with the accompanying drawings, in which.

DESCRIPTION OF THE PREFERRED EMBODIMENTS

The present invention will now be described with reference to its preferred embodiments in connection with the accompanying drawings, wherein like reference numbers or characters designate like or corresponding parts throughout the drawings.

Figure 1:
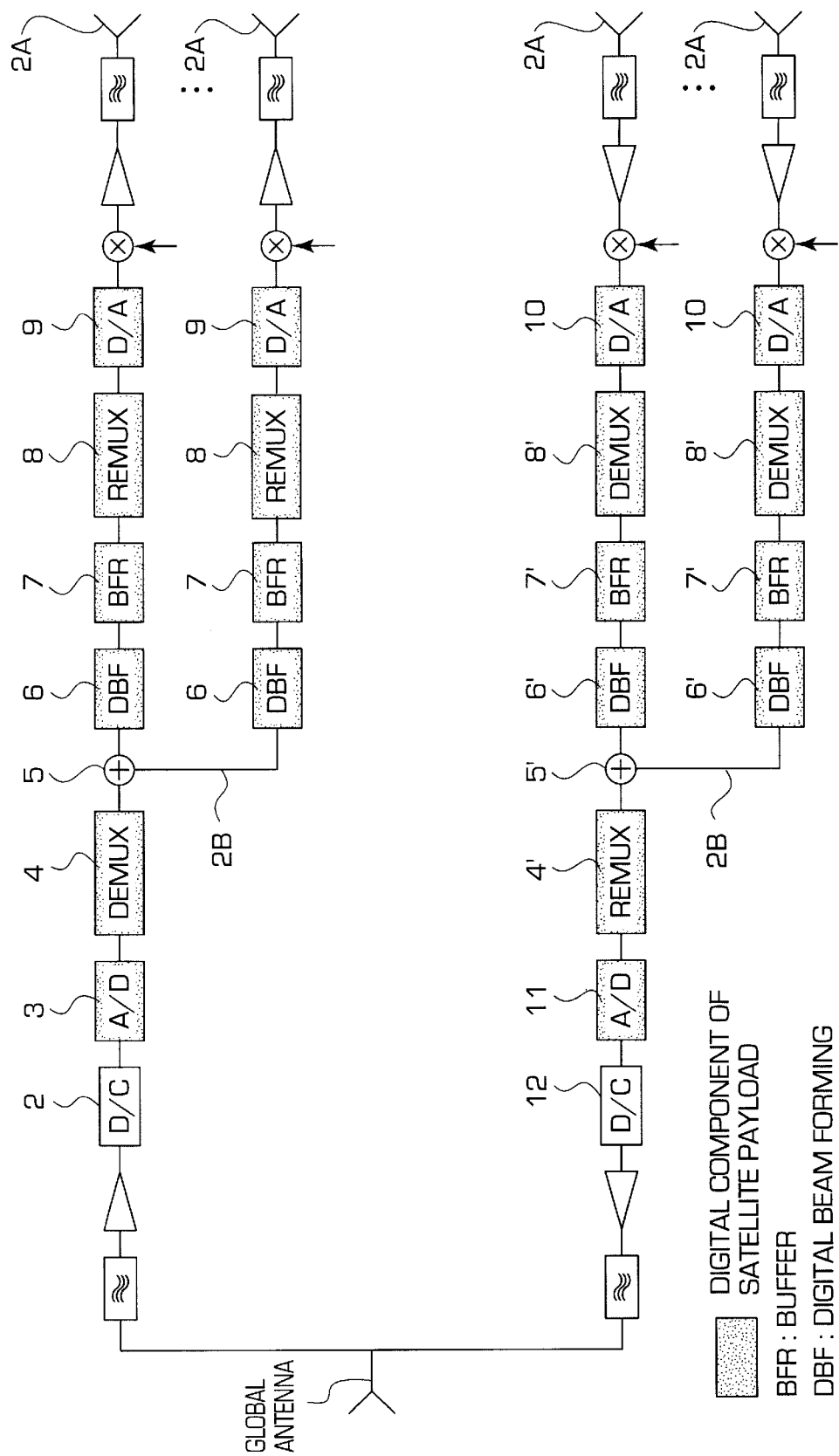
FIG. 1 illustrates a communications satellite payload with digital channelization and beam-forming.
Figure 2:
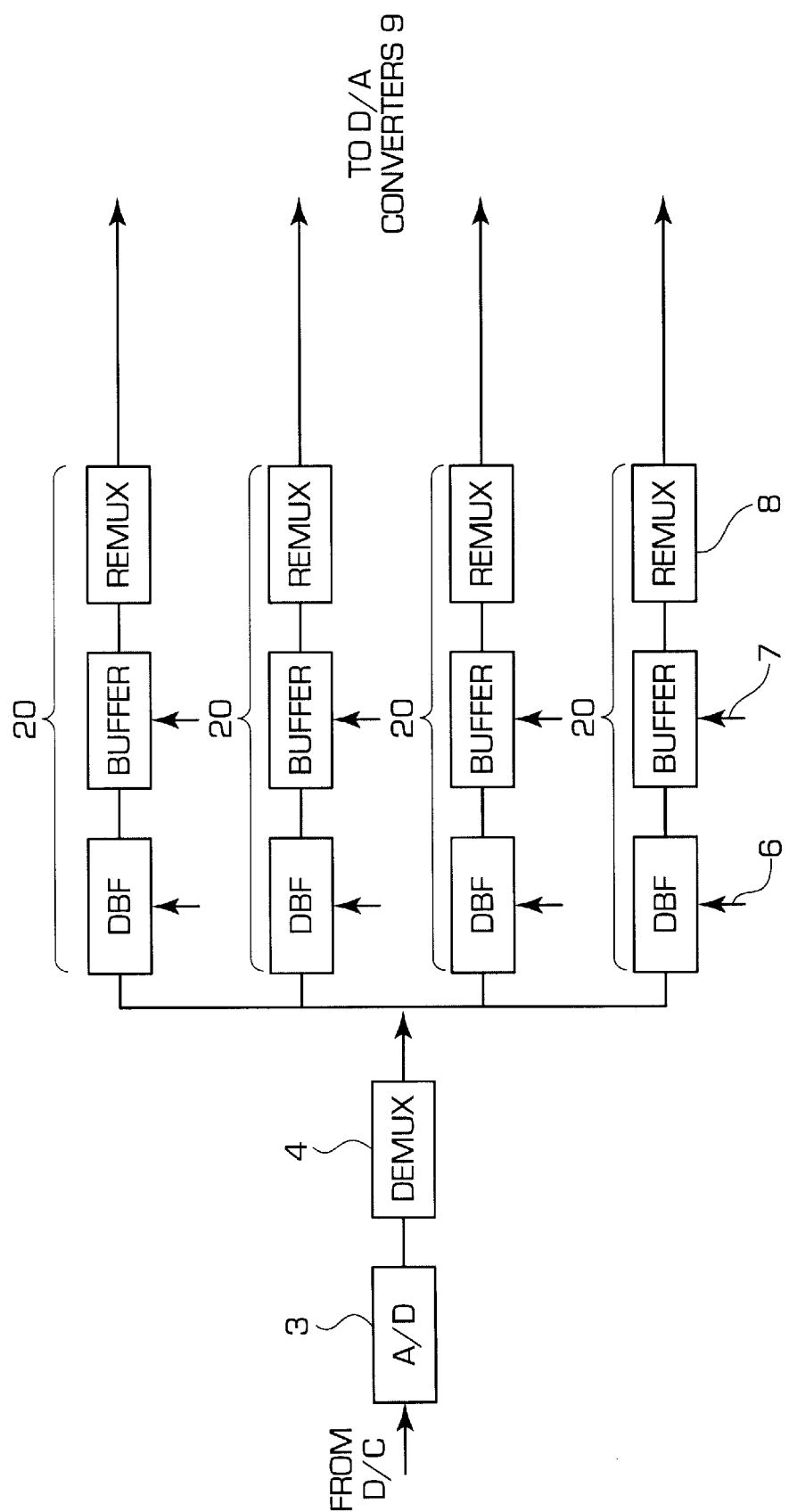
FIG. 2 illustrates an enlargement of the baseline processor of FIG. 1.
Figure 3:
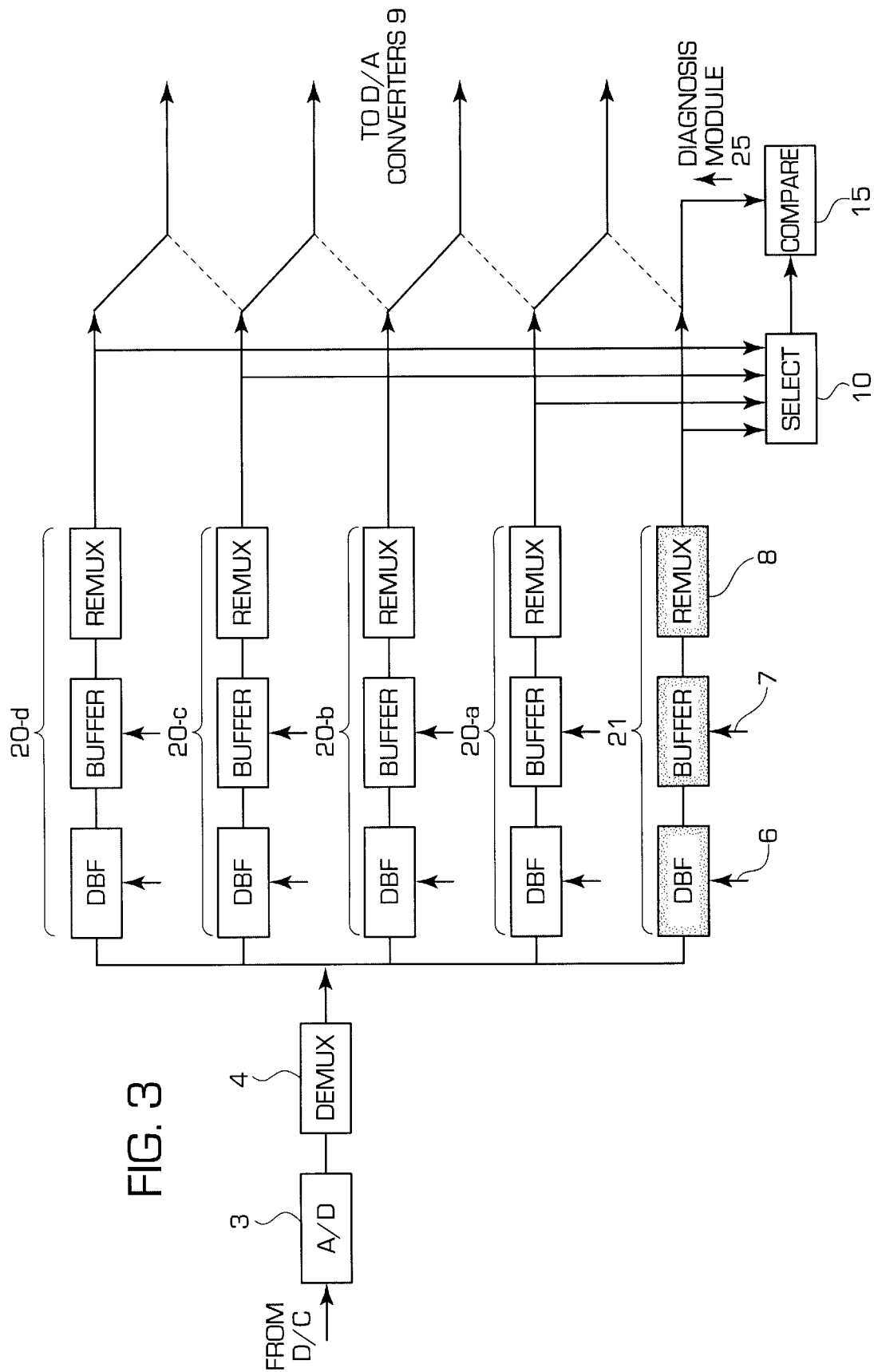
FIG. 3 illustrates a baseline processor of a satellite payload with a self diagnosis and a self healing scheme according to the present invention.

FIG. 3 illustrates the key feature of the present invention, namely, a self diagnosis and self healing scheme of the baseline processor in a conventional satellite payload. This figure illustrates the processing chains 20 of FIG. 2, plus one redundant chain 21, and some added digital logic 10 for selecting any of the several outputs of the chains 20a–20d, logic 15 for comparing the output of the select logic 10 and the output of the redundant chain 21, and a diagnosis module 25 (not shown). The design of each of these modules would be within the skill of one of ordinary skill in the art without undue experimentation.

Although only four parallel processing chains 20 are illustrated, the total number of processing chains may be much larger in accordance with the present invention. All of the chains are identical in that they each use the same hardware components, and differ only in software. As schematically illustrated in FIG. 3, the output of each processing chain from its respective remultiplexer will be sent to a D/A converter 9 that is shared with another processing chain such that chains 20a and 21 share one D/A converter, chains 20a and 20b share another D/A converter, chains 20b and 20c share yet another D/A converter, and chains 20c and 20d share a final D/A converter.

Figure 4:
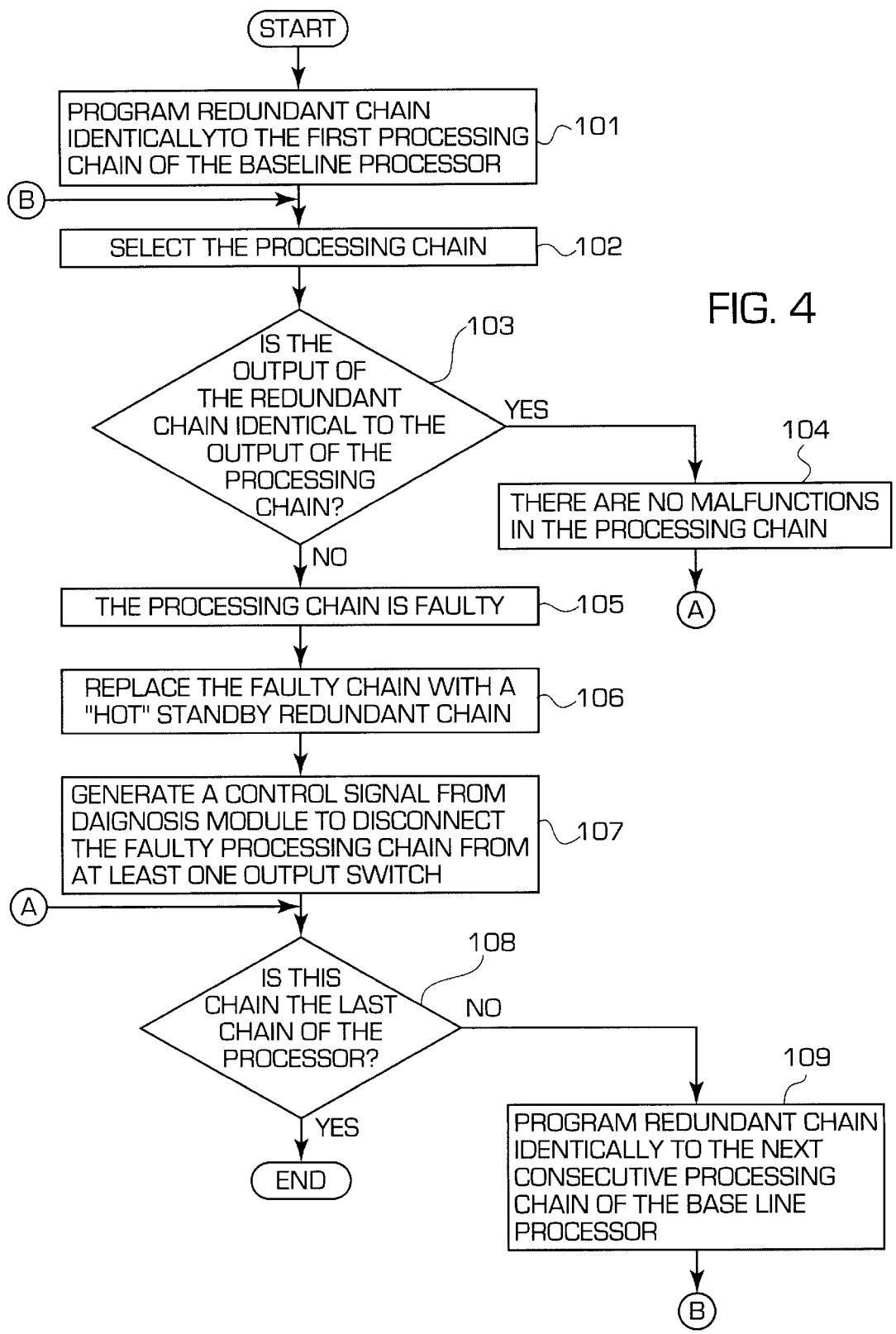
FIG. 4 is a control flowchart for the method of self diagnosing and self healing faulty processing chains of the baseline processor of FIG. 3.

The method of operating the arrangement illustrated in FIG. 3 is illustrated in the flowchart of FIG. 4. Referring to FIG. 4, in step 101, the redundant chain 21 is programmed identically to the first chain 20-a by downloading the appropriate software coefficients from a diagnostic controller module 25 (not shown). The diagnostic controller module may be preprogrammed with the appropriate coefficients or may have such coefficients supplied from a remote location via control channel. As illustrated in FIG. 3, the redundant chain 21 consists of digital beam forming 6, a buffer 7, and a remultiplexer 8. In step 102, the chain 20-a is selected by the SELECT block 10 and in step 103, its output is compared to that of the redundant chain 21 in the COMPARE block 15 in order to determine if the outputs are identical. If the two outputs are identical, it is determined in step 104 that there are no malfunctions in the processing chain 20-a, and the process moves to step 108 (see connector A). Finally, in step 108, it is determined whether chain 20-a is the last chain of the processor. If chain 20-a is the last chain of the processor, the program ends. However, as illustrated in FIG. 3, chain 20a is not the last chain of the processor. Therefore, in step 109, redundant chain 21 is programmed identically to the next consecutive processing chain 20-b and the cycle repeats.

On the other hand, if the outputs of chain 20-a and the redundant chain 21 are not identical in step 103, the processing chain 20-a is diagnosed as faulty in step 105. To rule out the possibility that the redundant chain 21 is itself faulty, its output is compared to chain 20-b. Thus, the faulty chain is switched out and replaced by a "hot" standby redundant chain in step 106. Further, in step 107, a control signal is generated from the diagnosis module 25 to alter the position of at least one output switch so that the faulty module is disconnected. Finally, in step 108, it is determined whether chain 20-a is the last chain of the processor. If chain 20-a is the last chain of the processor, the program ends. However, as illustrated in FIG. 3, chain 20-a is not the last chain of the processor. Therefore, in step 109, redundant chain 21 is programmed identically to the next consecutive processing chain 20-b. The cycle continues to repeat for the third chain 20-c, the fourth chain 20-d, and so on. Clearly, this process permits the identification of which processing chain 20, if any, is faulty. This scheme is completely autonomous providing both self diagnosis and self healing.

While the invention has been described above in detail, various changes and modifications within the scope and spirit of the invention will be apparent to those of working skill in this technological field. Thus, the invention is to be considered as limited only by the scope of the appended claims.

What is claimed is:

1. A payload for communications satellite having digital channelization and digital beam-forming comprising:

a plurality of processing chains each defined by respective signal processing coefficients;

a redundant chain that is programmable to have signal processing coefficients that are identical to a selected one of said plurality of processing chains; and an analog to digital converter; a demultiplexer coupled to the output of said analog to digital converter and a demultiplexer having an output that is coupled in common to said plurality of processing chains and said redundant chain;

wherein each of said plurality of processing chains and said redundant chain comprise:
digital beam-forming means;
a buffer coupled to the output of said digital beam-forming means; and
a remultiplexer coupled to the output of said buffer.

2. A payload for a communications satellite as defined in claim 1, wherein said digital beam forming means forms beams in desired directions by using a predetermined delay in each path of said array antenna elements of said array antenna.

3. A payload for a communications satellite having digital channelization and digital beam-forming comprising:

a plurality of processing chains each defined by respective signal processing coefficients;

a redundant chain that is programmable to have signal processing coefficients that are identical to a selected one of said plurality of processing chains;

a selection logic component, coupled to the outputs of said plurality of processing chains, for selecting the output of one of said plurality of processing chains; and a comparing logic component, coupled to the outputs of said digital logic component and said redundant chain, for comparing the output of said one of said plurality of processing chains, selected by said selection logic component, with the output of said redundant chain, and determining whether the compared outputs are different.

4. A payload for a communications satellite as defined in claim 3, wherein said one of said plurality of processing chains, selected by said selection logic component, is diagnosed as a faulty processing chain when its output and said output of said redundant chain, compared in said logical component, are not identical.

5. A payload for a communications satellite as defined in claim 4, wherein said redundant chain is a hot standby redundant chain; and further comprising switching means, connected to said hot standby redundant chain for disconnecting said faulty chain and replacing it with said hot standby redundant chain.

6. A payload for a communications satellite as defined in claim 4, further comprising a diagnosis module for generating a control signal upon diagnosis of said faulty processing chain so that said faulty processing chain is disconnected from at least one output switch.

7. A method for self diagnosis and self healing of a faulty processing chain, among a plurality of processing chains, in a communications satellite payload having a digital beam-forming network and at least one programmable redundant chain, said method comprising the steps of:

(a) programming a redundant chain of said payload to have parameters identical to one processing chain among said plurality of processing chains;

(b) selecting said one processing chain;

(c) comparing the output of said selected processing chain with the output of said redundant chain;

(d) judging whether the outputs of said processing chain and said redundant chain are identical;

(e) diagnosing said processing chain as faulty if said outputs are judged not to be identical in said step (d); and (f) determining that there are no malfunctions in said processing chain if said outputs are judged to be identical in said step (d).

8. The method as claimed in claim 7, wherein said method further comprises the step (g) of replacing said one processing chain with a hot standby redundant chain if said processing chain is diagnosed as faulty in said step (e).

9. The method as claimed in claim 8, wherein said method further comprises the step of (h) of disconnecting said one processing chain from at least one output switch if said processing chain is diagnosed as faulty in said step (e).

10. The method as claimed in claim 8, wherein said method further comprises the step of (i) repeating said steps (a)–(h) for at least one other processing chain of said plurality of processing chains.

11. The method as claimed in claim 8, wherein said method further comprises the step of (i) repeating said steps (a)–(h) for all currently operational processing chains of said plurality of processing chains.

* * * * *